UNITED STATES PATENT OFFICE.

MAX ALBERT KUNZ, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRACENE DYE.

992,567.

Specification of Letters Patent. Patented May 16, 1911.

No Drawing. Application filed January 31, 1911. Serial No. 605,778.

*To all whom it may concern:*

Be it known that I, MAX ALBERT KUNZ, Ph. D., chemist, citizen of the Swiss Republic, residing at Mannheim, Germany, have invented new and useful Improvements in Anthracene Dyes, of which the following is a specification.

My invention relates to new coloring matters of the anthracene series which are methyl derivatives of N-dihydro-anthraquinon-azin (indanthrene blue) containing one or more methyl groups attached to carbon atoms of the anthracene residues.

My new coloring matters can be produced by applying any of the methods which are employed for the production of indanthrene blue itself to the corresponding methylated initial materials, namely by melting 2-amino-methyl-anthraquinon with caustic potash and oxidizing the leuco compound thus formed (cf. Patent No. 682,523), or by treating 2-amino-methyl-anthraquinon with an oxidizing agent (cf. Patent No. 739,145), or by treating 1-amino-methyl-anthraquinon with an acid agent or a metallic salt (cf. Patent No. 855,248). Other methods of producing indanthrene blue or halogenated products thereof consist in treating 1-amino-2-halogen-anthraquinon or 2-amino-1.3-dihalogen-anthraquinon with a suitable condensation agent (cf. British Patent No. 7692/04) and in condensing an ortho-diamino-anthraquinon with an ortho-dihydroxy-anthraquinon (cf. British Patent No. 9102/06), and these processes can also be applied to methyl substituted initial materials.

My said new coloring matters possess all the valuable properties of the indanthrene coloring matters and further differ in some respects from the indanthrene blues, so that they afford a valuable addition to this group of products. Thus for instance the 33'-dimethyl-indanthrene obtained from 2-amino-3-methyl-anthraquinon possesses a much greener shade of blue than does indanthrene blue itself, obtained from 2-aminoanthraquinon. On the other hand, the dimethyl-indanthrene obtained from 6-methyl-2-amino-anthraquinon possesses shades which are similar to those yielded by indanthrene blue itself, but it differs from it in other ways. All my new coloring matters are characterized by being more soluble in nitrobenzene than in indanthrene blue itself, and they also have excellent dyeing properties and are very fast.

If desired, in producing the new coloring matters of my invention, derivatives of amino-anthraquinon can be employed which contain another group, or other groups, as well as the methyl group, the said other group, or groups, being situated either in the anthraquinon residue, or attached to the nitrogen atom of the amino group, or both being situated in the said group and attached to the said atom. Similar coloring matters can also be obtained by condensing an ortho-diamino-anthraquinon with ortho-dihydroxy-methyl-anthraquinon.

The following examples illustrate methods of producing some of my new coloring matters, but I do not limit my invention to the coloring matters therein described. The parts are by weight.

Example 1: Boil together, for three hours, one part of 2.3-amino-methyl-anthraquinon, forty parts of glacial acetic acid, and three parts of lead peroxid. When the mixture is cold, filter off the coloring matter and boil it with dilute hydrochloric acid to remove the lead. The 3.3'-dimethyl-indanthrene blue thus obtained can be crystallized from a large quantity of nitrobenzene and obtained in the pure form. It is a bluish green crystalline powder which is very difficultly soluble in organic solvents and yields a blue vat which colors cotton blue shades which, upon washing, are converted into bluish green shades. In a similar manner, coloring matters can be obtained from 6-methyl-2-amino-anthraquinon and from 7-methyl-2-amino-anthraquinon.

Example 2: Introduce one part of 7-methyl-2-amino-anthraquinon into four parts of caustic potash at a temperature of from two hundred to two hundred and fifty degrees centigrade, and then (while stirring) continue heating for thirty minutes at the same temperature. When the melt is cold, boil it with water, and filter and wash. The 7.7'-dimethyl-indanthrene blue can be crystallized from nitrobenzene and obtained as a dark blue crystalline powder. It yields a blue vat which dyes cotton dark blue shades, and has great covering power. In a similar manner, 6.6'-dimethyl-indanthrene blue can be obtained from 6-methyl-2-amino-anthraquinon.

Examp e 3: Boil together, for from four to five hours, ten parts of 1-brom-2-amino-3-methyl-anthraquinon, one hundred and twenty parts of naphthalene, one part of copper oxid, five parts of anhydrous sodium acetate, and four parts of magnesium oxid. While the mass is hot, filter off the bluish green coloring matter and wash it, successively, with hot alcohol, dilute hydrochloric acid, and water. The product is similar to that obtained according to the foregoing first example.

Now what I claim is:—

1. The new coloring matters of the anthracene series being methyl-indanthrene blues containing at least one methyl group attached to a carbon atom of the anthracene residue, which new coloring matters are insoluble in water and in dilute acids and alkalis, but are soluble in alkaline hydrosulfite yielding vats which dye cotton from blue to green shades, and which coloring matters are more soluble in nitrobenzene than is ordinary non-methylated indanthrene blue.

2. The new coloring matters of the anthracene series being dimethyl indanthrene blues containing two methyl groups attached to carbon atoms of the anthracene residue or residues, which upon analysis in the pure condition show a composition corresponding to the formula $C_{30}H_{18}N_2O_4$ and are insoluble in water and in dilute acids and alkalis, but are soluble in alkaline hydrosulfite yielding vats which dye cotton from blue to green shades, and which coloring matters are more soluble in nitrobenzene than is ordinary non-methylated indanthrene blue.

3. The new coloring matter being 3.3'-dimethyl-indanthrene blue which consists when dry of a bluish green powder which yields a blue vat which colors cotton blue shades, which upon washing are converted into bluish green shades, and which coloring matter is insoluble in water and in dilute acids and alkalis and is difficultly soluble in most organic solvents, but is more soluble in nitrobenzene than is ordinary indanthrene blue.

In testimony whereof I have hereunto set my hand in the presence of two subscribing witnesses.

MAX ALBERT KUNZ.

Witnesses:
J. ALEC. LLOYD,
A. O. TITTMANN.